May 19, 1953 G. J. STEINE Re. 23,659

HOLDER FOR SET SCREW WRENCHES AND THE LIKE

Original Filed Sept. 4, 1948

INVENTOR.

George J. Steine

BY

Cumming & Cumming

Attys.

Reissued May 19, 1953

Re. 23,659

UNITED STATES PATENT OFFICE 23,659

HOLDER FOR SET SCREW WRENCHES AND THE LIKE

George J. Steine, Glencoe, Ill., assignor to Metal Engineering Company, a corporation of Illinois Original No. 2,604,211, dated July 22, 1952, Serial No. 47,816, September 4, 1948. Application for reissue August 22, 1952, Serial No. 305,927

5 Claims. (Cl. 211—69)

Matter enclosed in heavy brackets [ ] appears in the original patent but forms no part of this reissue specification; matter printed in italics indicates the additions made by reissue.

This invention relates to a holder for set screw wrenches and the like. It is adapted to support a plurality of such devices in a position convenient for grasping and removal, all of the wrenches being exposed to view at all times. The holder is simple and inexpensive to produce; it is light and compact; and in use it is adapted to be placed upon a bench or wall with the supported wrenches or other tools always accessible for inspection and removal.

The holder comprises a hollow body which may be made of plastic or other material having a top wall wherein is a plurality of holes of progressively increasing sizes arranged adjacent its periphery. Through the top wall is a hole for reception of a post which depends within the holder to support a compressible resilient disc whose edge lies proximate to an open slot in each of a plurality of vertically extending guides of progressively increasing size, one in register with each hole in the holder top. The shank of a set screw wrench, when pushed downwardly through a top hole of appropriate size and through its associated guide, will engage the disc adjacent its edge and displace the same inwardly. A frictional pressure directed laterally against the wrench shank will thereby be maintained in a degree sufficient to secure the wrench frictionally in place and in any adjusted axial or rotative position. It is largely with a holder having these special characteristics that my present invention is concerned.

Referring to the accompanying drawings.

Figure 1:
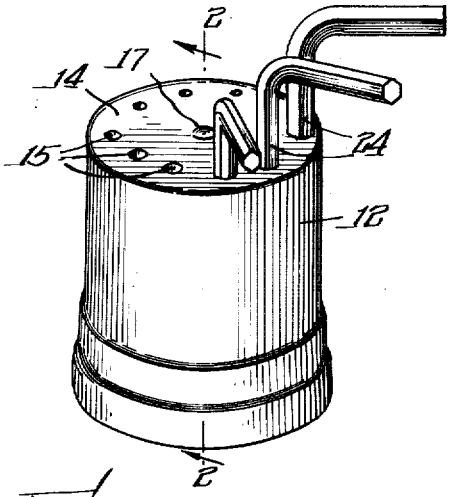
Figure 1 is a perspective view of my improved holder showing three wrenches received therein, the top holes for additional wrenches being exposed to view.

As herein illustrated, my improved holder comprises a hollow casing made of plastic or other suitable material and formed with side walls 12 and a top wall 14 wherein is a plurality of holes 15 of progressively increasing size arranged preferably adjacent its periphery. Through the top wall is a substantially central hole 16 for reception of a post here shown as a double-headed rivet 17 which extends downwardly through a spacer boss 18 to support therebelow a plurality of compressible resilient discs 19 of rubber or other like displaceable material. The upper of the two discs shown is separated by the spacer boss 18 from the top wall 14 so as to have capacity for flexing either up or down. The several discs are preferably of the same size and shape, and on the under side of the lower disc is a supporting plate 20 of somewhat lesser diameter.

The edges of the several discs lie proximate to a plurality of open slots 22 each upon the inner side of a vertically extending guideway 23. These guideways which may be formed integral with the side walls 12 of the holder casing, interiorly thereof, are of progressively increasing size and in register with the holes 15 of corresponding size in the top wall 14 of the casing.

Figure 2:
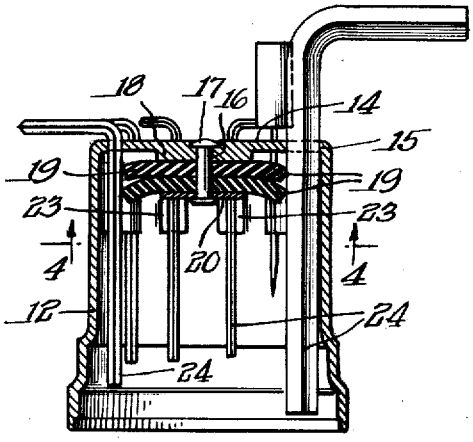
Fig. 2 is a central vertical section, taken on line 2—2 of Fig. 1.
Figure 3:
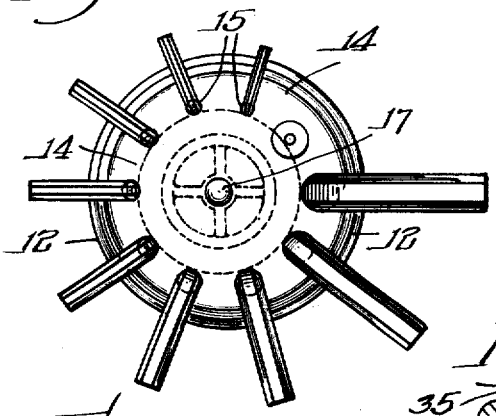
Fig. 3 is a plan view of the holder as it appears when supporting a supply of wrenches and also a pick.
Figure 4:
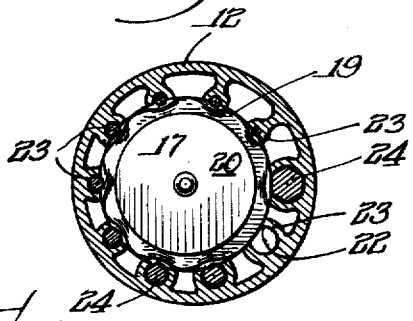
Fig. 4 is a transverse section, taken on line 4—4 of Fig. 2.

When the shank 24 of a set screw wrench, pick, or other tool is inserted through the appropriate hole 15 in the casing top wall and pushed downwardly through its associated guideway 23, it is brought into frictional engagement with the edge portion of the several resilient discs 19, causing each of them to be fixed downwardly, as illustrated in Fig. 2. In consequence, a continuing radially directed force is maintained against each wrench shank 24 at spaced points so as to hold the tool in place frictionally in a desired position both axially and rotatively. When a reverse pull takes place, sufficient to compress each disc inwardly preliminary to a reverse deflection thereof, the wrench may be readily removed from the holder.

Figure 5:
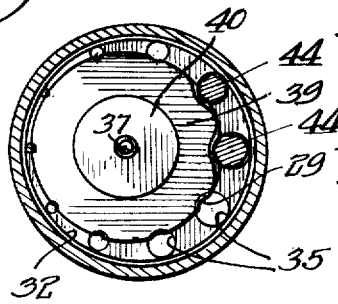
Fig. 5 is a transverse section through the modified holder construction of Fig. 6, taken on line 5—5 thereof.
Figure 6:
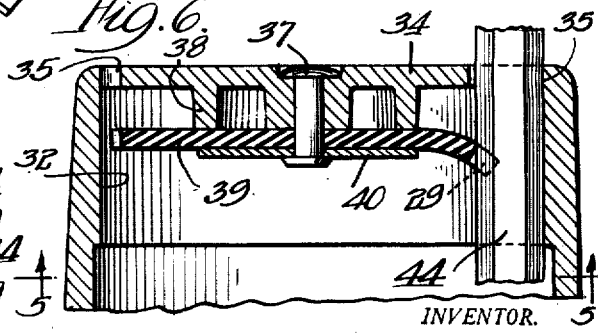
Fig. 6 is a fragmentary vertical section through the holder of Fig. 5.

Fig. 5 which is a sectional view through the holder casing of Fig. 6 shows a modification in the friction disc 39 which is recurrently notched at 29 at points directly below the holes 35 of varying size in the top wall 34. The presence of these notches diminishes the need for guides so that their presence may be omitted, if desired. By the provision of notches 29 in the disc in register with the top holes 35, in conjunction with the adjacent side walls 32 of the holder casing, a sufficient support is thereby afforded to sustain the shanks of the several wrenches 44 in substantially vertical position. The disc 39 is shown as resting upon a relatively small plate 40 which is carried by a post 37 depending from the holder top wall 34 and through a boss 38 which fixes the position of the disc in spaced relation to the holder top. The action of this disc in exerting a frictional pressure upon the tool shank is the same as already described.

It will be apparent that the present holder makes use of the frictional properties of one or more yielding discs which are both resilient and compressible. The tool to be retained in place is advanced endwise against the edge portion of the friction disc or discs so as to produce a deflection thereof and also, to some extent, an inward displacement thereof. A very effective friction lock is thereby provided for presenting reverse movement of the tool outwardly from the holder. In order that such a reverse movement may take place each disc is required to be further displaced inwardly preliminary to a deflection thereof in the opposite direction, consequently an added force is required to start the reverse movement of the tool when it is to be removed from the holder.

Although the showing in the drawings indicates a holder having a top wall through which the wrenches or other tools are inserted downwardly so as to present their shanks in substantially vertical planes, this is merely one convenient way of constructing and using the device. It may be preferred, in some instances, that the holder be designed for wall mounting in which case the top wall 14 would be vertically disposed, and the several tools would be inserted by advancing their shanks in substantially horizontal planes.

Accordingly the words "upper, lower, top" etc., as used throughout this description, are to be considered as relative terms, and not as indicative of location.

I claim:

1. A holder for set screw wrenches and the like comprising a hollow casing having a top head through which is a plurality of spaced-apart holes of progressively increasing size, each hole being located proximate to the inside face of a vertical wall of the casing, a plurality of vertical guides within the holder, one in line with each top hole, each guide having a longitudinal slot opening out upon its inner side, all of said slots lying tangent to a common inside circle and being of such size as to position portions of the exposed shanks of the wrenches within said circle, and a resilient disk of a diameter substantially equal to the diameter of said circle and carried within the holder below the top head thereof and parallel therewith and presenting its periphery adjacent the guide slots for engagement with said portions of the exposed shanks of the wrenches when inserted downwardly through the top holes into the guides therebelow, thereby to exert an outwardly directed pressure against each wrench sufficient to support it frictionally in place above and in spaced relation with the lower end of the casing, whereby set screw wrenches of different lengths may be firmly and releasbly clamped in the holder in suspended relation with the top head.

2. A holder for set screw wrenches and the like comprising a hollow casing having a top head through which is a plurality of spaced-apart holes of progressively increasing size, each hole being located proximate to the inside face of a vertical wall of the casing, a plurality of vertical guides within the holder, one in line with each top hole, each guide having a longitudinal slot opening out upon its inner side, all of said slots lying tangent to a common inside circle and being of such size as to position portions of the exposed shanks of the wrenches within said circle, and a plurality of resilient disks, each of a diameter substantially equal to the diameter of said circle and carried within the holder below the top head thereof and parallel therewith and presenting its periphery adjacent the guide slots for engagement with said portions of the exposed shanks of the wrenches when inserted downwardly through the top holes into the guides therebelow, thereby to exert an outwardly directed pressure against each wrench to support the same in a fixed position within the holder, and common means supporting the two disks at points centrally thereof whereby to leave the disk edges free for deflection in response to engagement by said portions of the exposed shanks of the wrenches.

*3. A holder for tools or the like comprising a hollow casing having a top head through which is a plurality of spaced-apart holes, each hole being located proximate to the inside face of a vertical wall of the casing, a plurality of vertical guides within the holder, one in line with each top hole, each guide having a longitudinal slot opening out upon its inner side, and a resilient member carried within the holder below the top head thereof and shaped as to present its periphery adjacent the guide slots for engagement with a portion of tools inserted downwardly through the top holes into the guides therebelow and exposed in said slots, thereby to exert an outwardly directed presure against each tool sufficient to support it frictionally in place in the holder.*

*4. A holder for tools or the like comprising a hollow casing having a top head through which is a plurality of spaced-apart holes, each hole being located proximate to the inside face of a vertical wall of the casing, a plurality of vertical guides within the holder, one in line with each top hole, each guide having a longitudinal slot opening out upon its inner side, a resilient disk within the holder, means supporting the disk in the holder below the top head thereof in a manner permitting the peripheral portion of the disk to deflect upwardly and downwardly, said disk being shaped as to present its peripheral edge adjacent the guide slots for engagement with a portion of tools inserted downwardly through the top holes into the guides therebelow and exposed in said slots, thereby to be deflected downwardly by the insertion of a tool and to exert an outwardly directed pressure against each tool sufficient to support it frictionally in place in the holder and to require compression and upward deflection of said peripheral portion to withdraw a tool from the holder, whereby to resist withdrawing movement of the tool.*

*5. A holder for tools or the like comprising a hollow casing having a top head through which is a plurality of spaced-apart holes; a plurality of vertical guides within the holder, one in line with each top hole, each guide having a longitudinal slot opening out upon one of its sides, said slots being arranged so that a line lying in a plane normal to the guides and passing through each of the slots defines a predetermined geometric figure; a resilient member having a peripheral edge corresponding substantially in size and shape to said geometric figure, means for supporting said member within the holder in a manner permitting the peripheral edge thereof to deflect upwardly and downwardly and to present the peripheral edge of the member adjacent the guide slots for engagement with a portion of tools inserted downwardly through the top holes into the*

*guides therebelow and exposed in said slots, thereby to be deflected downwardly by the insertion of a tool and to exert an outwardly directed pressure against each tool sufficient to support it frictionally in place in the holder and to require compression and upward deflection of said peripheral edge to withdraw a tool from the holder, whereby to resist withdrawing movement of the tool.*

GEORGE J. STEINE.

References Cited in the file of this patent or the original patent

UNITED STATES PATENTS

| Number | Name | Date |
|---|---|---|
| 35,786 | Smith | July 1, 1862 |
| 386,696 | Elwell | July 24, 1888 |
| 540,268 | Newell | June 4, 1895 |
| 1,965,032 | Davey | July 3, 1934 |
| 2,429,305 | Barnes | Oct. 21, 1947 |
| 2,513,894 | Rogers | July 4, 1950 |

FOREIGN PATENTS

| Number | Country | Date |
|---|---|---|
| 5,972 | Great Britain | 1914 |
| 210,566 | Great Britain | Feb. 7, 1924 |
| 420,968 | Great Britain | Dec. 11, 1934 |

Certificate of Correction

Reissue No. 23,659 May 19, 1953

GEORGE J. STEINE

It is hereby certified that error appears in the printed specification of the above numbered patent requiring correction as follows:

Column 2, line 28, for "fixed" read flexed ;

and that the said Letters Patent should be read as corrected above, so that the same may conform to the record of the case in the Patent Office.

Signed and sealed this 21st day of July, A. D. 1953.

[SEAL]

THOMAS F. MURPHY,
*Assistant Commissioner of Patents.*